United States Patent

[11] 3,614,174

| [72] | Inventor | Ervin G. Romero |
| | | Seattle, Wash. |
| [21] | Appl. No. | 843,569 |
| [22] | Filed | July 22, 1969 |
| [45] | Patented | Oct. 19, 1971 |
| [73] | Assignee | The Boeing Company |
| | | Seattle, Wash. |

[54] ANTISKID CONTROL SYSTEM
7 Claims, 4 Drawing Figs.

[52] U.S. Cl........................................................ 303/21 CG,
188/181 A, 303/20
[51] Int. Cl........................................................ B60t 8/12
[50] Field of Search........................................... 188/181 C,
181 A; 303/21 P, 21 BE, 21 ED, 21 CG, 21 A, 21
BB, 21 CE; 324/70 A, 162

[56] References Cited
UNITED STATES PATENTS

| 2,980,369 | 5/1961 | Ruof........................... | 303/21 |
| 3,017,145 | 1/1962 | Yarber......................... | 303/21 |
| 3,026,148 | 3/1962 | Ruof........................... | 303/21 |
| 3,192,503 | 6/1965 | Lang............................ | 340/27 |
| 3,235,036 | 2/1966 | Meyer et al.................. | 188/181 |
| 3,245,727 | 4/1966 | Anderson et al............. | 303/21 |
| 3,275,384 | 9/1966 | Hirzel.......................... | 303/21 |
| 3,301,608 | 1/1967 | Harned et al................ | 303/21 |
| 3,494,671 | 2/1970 | Slavin et al................. | 303/21 |

Primary Examiner—Milton Buchler
Assistant Examiner—Stephen G. Kunin
Attorneys—Glenn Orlob, Kenneth W. Thomas and Conrad O. Gardner ABSTRACT: An antiskid control system for controlling a wheel being braked which includes circuits for causing the system to respond continuously to overtorqued conditions of the wheel previous to the occurrence of larger torque imbalance conditions indicative of skid conditions. The system comprises a novel combination of circuitry, including a wheel driven generator, a differentiator circuit including an amplifier, and modulator circuits for providing a modulated valve control signal for causing a decrease or increase of applied braking effort to the wheel being braked as a function of the deceleration rate of the wheel.

INVENTOR:
ERVIN G. ROMERO
BY
Conrad O. Gardner
ATTORNEY

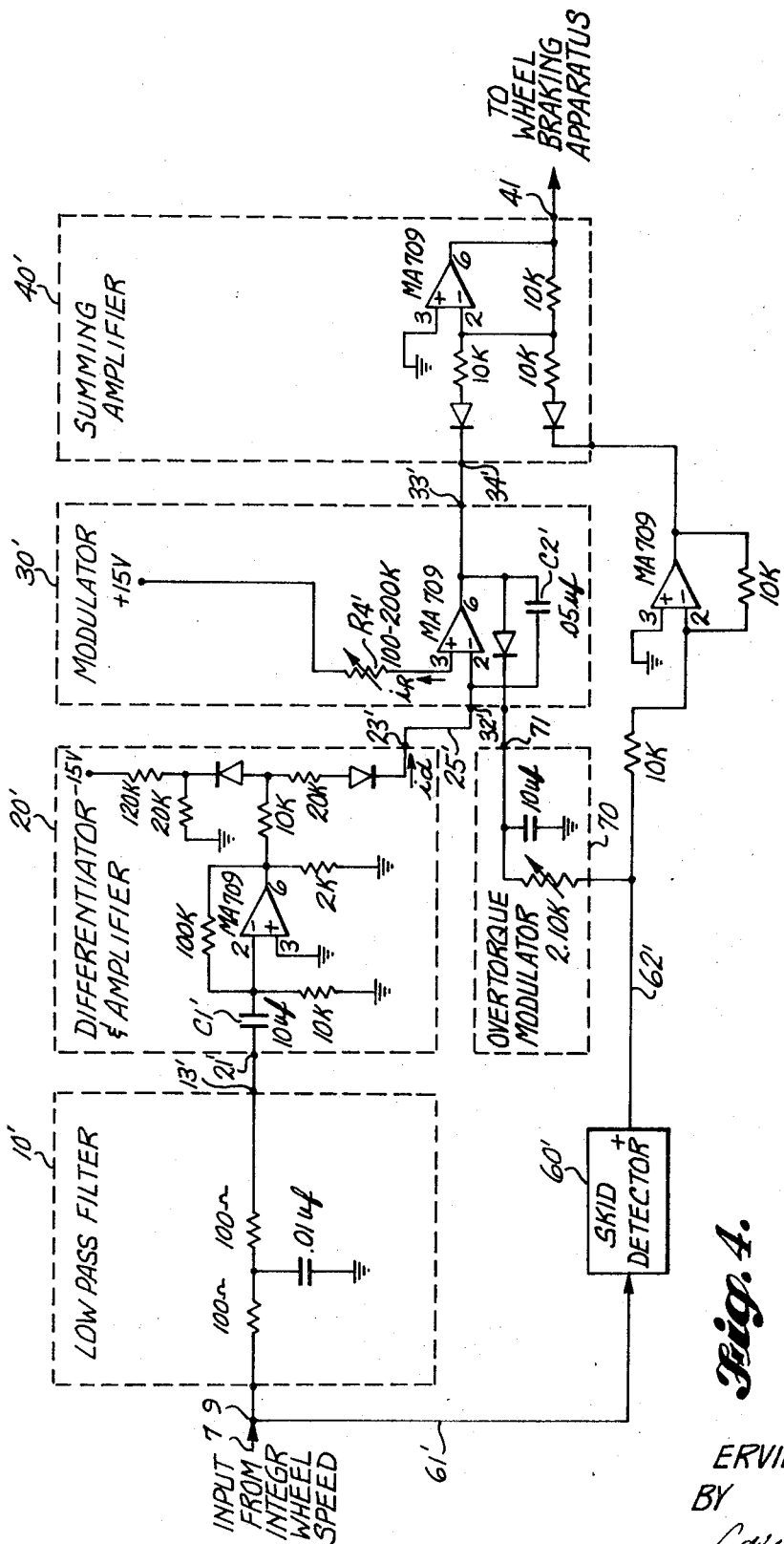

ANTISKID CONTROL SYSTEM

This invention relates to a method and apparatus for brake control of vehicles, and, more particularly, to antiskid-type brake control systems.

With the advent of modern electronic antiskid control systems and the continued development of these systems, two types or classes of systems have emerged and the state of the art has been advanced by continuous improvement of these two classes of systems. The first type of antiskid system now in widespread use forces a wheel into a skid by a programmed application of brake pressure, removal of pressure, and then reapplication of pressure at a level just below the pressure that caused the skid to occur. A programmed reapplication of pressure causes the cycle to reoccur. This first type of system may be called a "sampling system" because it determines brake pressure by sampling skid. This first type or sampling system depends on a departure of wheelspeed from a stable braking speed to determine the maximum brake pressure operating point. Skid-sampling system patents disclosing programmed pressure application and representing the first type system include U.S. Pat. Nos. to Anderson, 3,245,727; Hirzel, 3,275,384; Yarber, 3,017,145; and Ruof, 3,034,836. A second type or class of systems now in use operates on the principle that at the maximum brake pressure operating point, a slip condition exists which is related to the speed of the vehicle. This second type system also depends upon a wheelspeed change to correct brake pressure and may be termed "slip control system," such a system being disclosed in U.S. Pat. No. 3,235,036, to Meyer.

The above classes of systems depend upon wheelspeed departure to control brake pressure. Significant wheelspeed departure is therefore required to generate a control signal for effecting relaxation of brake pressure. When there is a significant wheelspeed departure from synchronous speed or vehicle speed, then the wheel has reached an increasingly overtorqued condition which in a very short time interval measured in milliseconds results in wheel degeneration into a skid. A clear necessity therefore exists for the obtaining of data which can be developed to provide control signals for controlling brake pressure during the time period before a skid condition is reached.

It is therefore an object of this invention to provide for development of control signals from information derived from wheel status before skid.

Another object of this invention is to provide for the prevention of unnecessary wheelspeed departures.

A further object of this invention is to provide means for continuously maintaining a target or predetermined and desired deceleration rate for a wheel upon the application of braking effort.

Yet another object of this invention is to provide means for continuously minimizing excess brake torque and consequent excessive wheel deceleration thereby preventing a skid occurrence.

Still another object of this invention is to provide means for continuously modulating the braking pressure metered by the operator of a vehicle to a wheel in a manner to continuously approach an equilibrium condition of a target rate of deceleration of the wheel.

The present antiskid system is uniquely characterized by its utilization and particular mode of processing of the earliest information of significance available concerning wheel conditions to provide those proper control signals required to achieve target deceleration of the wheel.

In accordance with the invention, a signal is obtained from a wheelspeed transducer and converted into a DC voltage proportional to wheelspeed, filtered for undesirable noise, and fed into a means for differentiating this voltage with a response time such that for small changes in wheelspeed velocity occurring during small time intervals, a signal representative of the instantaneous deceleration is developed rather than a signal representative of the average deceleration over these small time intervals. The differentiator means includes an amplifier providing an output current representative of deceleration, the amplifier being arranged to provide increased gain when a certain predetermined deceleration rate is achieved by the wheel. The output current representative of deceleration is provided as an input signal to a modulator, the modulator output controlling the antiskid valve and thus the brake pressure. A target deceleration in the form of a reference current is provided in the modulator and compared in the modulator with the current at its input which is representative of instantaneous deceleration by taking the time integral of the instantaneous difference of these two signal currents to provide the modulator output signal. This output signal is utilized as a first control signal to control the antiskid valve thus modulating brake pressure only when the actual wheel deceleration deviates from the target deceleration. This assures that unnecessary wheelspeed departures will not be permitted. The modulation output or first control signal in the form utilized on the antiskid valve removes only the excess pressure required to restore stability.

In parallel with the above-defined control channel for developing a first control signal for energizing the antiskid valve from the DC voltage proportional to wheelspeed, there can be provided a second channel or loop of the type which includes a conventional antiskid control circuit which provides an overriding second control signal to the antiskid valve of larger amplitude than the first control signal to more fully release brake pressure when the overtorqued condition has become too large for the modulator and first control signal to correct, such as that which may result from a substantial change in ground friction, etc., tending to cause the wheel to degenerate into a skid.

The performance characteristics of the present dual channel antiskid-type control arrangement in braking systems will be appreciated by those skilled in the art since the first channel operates in a linear mode and provides a first control signal capable of providing continuous modulation of brake pressure over a certain range of deceleration to achieve an optimum desired predetermined rate of deceleration, while the second channel operating in a nonlinear mode can provide that control necessary in those instances of large torque unbalances of the system which cannot be controlled and corrected in the early stages of deteriorating wheel performance by the modulation of brake pressure by the first control signal.

A full understanding of the invention, and of its further objects and advantages, will be had from the following description when taken in conjunction with the accompanying drawings in which:

FIG. 4 is a schematic diagram of a further embodiment of circuits which may be utilized to develop in a similar manner from DC wheelspeed voltage, control signals to be transmitted to the wheel-braking apparatus of the type shown in the system of FIG. 1.

Figure 1:
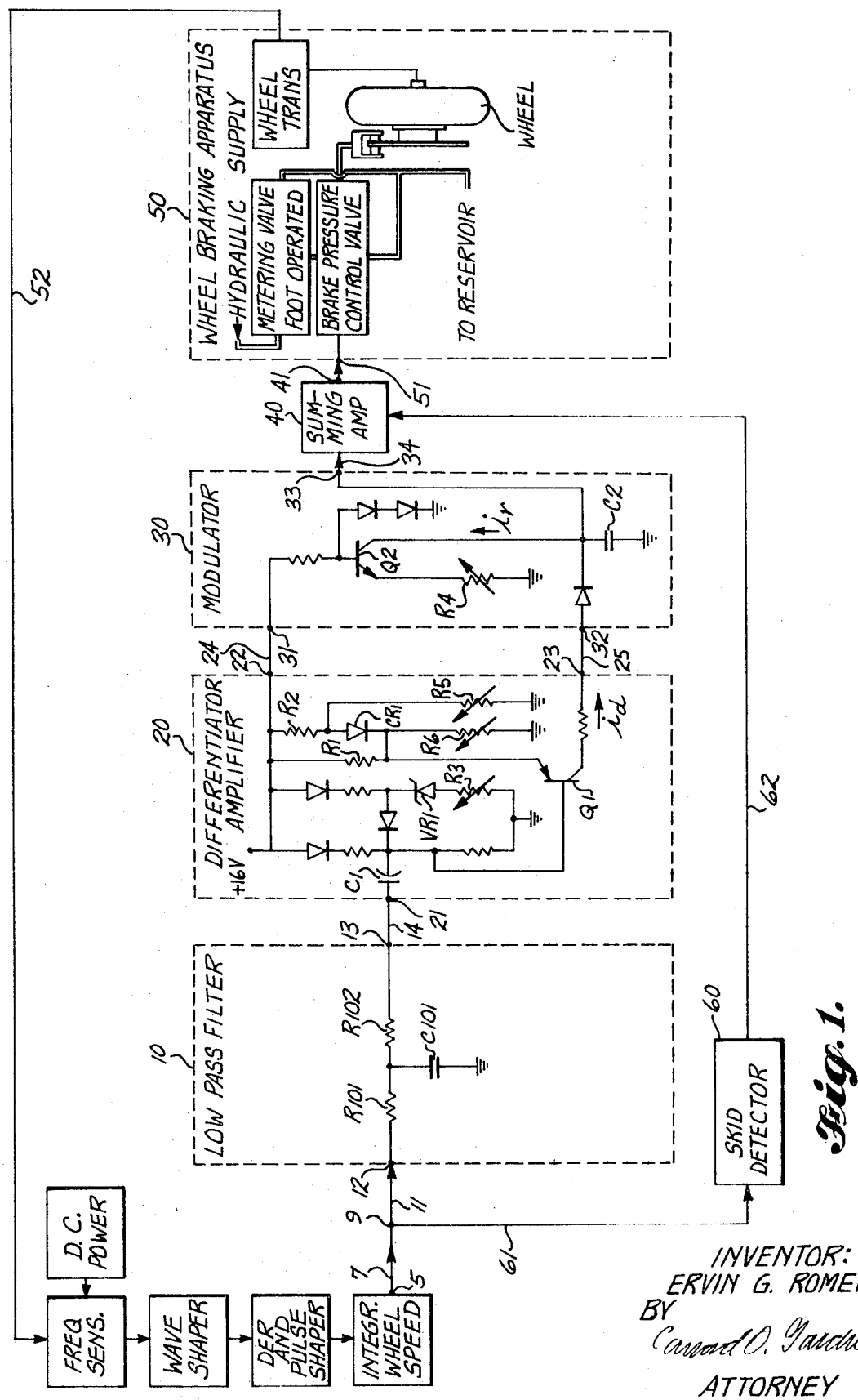
FIG. 1 is a schematic diagram of circuits and apparatus illustrative of one embodiment of the invention.

Referring now to FIG. 1 of the drawings, there is shown a brake control system incorporating an individual antiskid control circuit for controlling the braking effort applied to a wheel so as to more nearly approach skid-free operation and thereby increase braking effectiveness. While a single system is shown for controlling braking effort applied to a single wheel, it should be understood that in an aircraft having a plurality of independently rotatable load-bearing wheels, each wheel may be equipped with the present system. Wheelbraking apparatus 50 is conventional and is as shown as a portion of the system of FIG. 1 of U.S. Pat. No. 3,026,148 to Ruof. The brake pressure control valve is of known type, as described in the aforementioned Ruof patent, and when a valve control signal is applied to the input terminal 51 of the brake pressure control valve-operating circuit, the output pressure is a function of the control signal. When there is no control current introduced at terminal 51, the valve does not interfere with the normal operation of the metering valve. A wheelspeed transducer is shown coupled to the wheel in conventional manner, the output of the transducer is coupled through lead 52 to frequency sensing, wave shaping, differentiating and pulse shaping, and integrating circuits of known type to provide an output potential representative of the instant value of the rotational speed of the wheel on lead 7. This conventionally developed signal may be developed in the same manner as that provided on lead 7 of the schematic diagram shown in FIG. 2 of the U.S. Pat. No. 3,245,727 to Anderson et al., supra. From the DC voltage generated which is proportional to wheelspeed appearing at the input terminal 9 of the antiskid control portion of the braking system, there is developed in a first channel a first control signal $V_c$ which appears at output terminal 33 of modulator 30.

The input signal whose amplitude is representative of instantaneous wheelspeed which is presented to the antiskid control circuit input terminal 9 from the integrating network output terminal 5 by means of lead 7 is transmitted in the first channel to the input terminal 12 by lead 11 coupling input terminal 9 to input terminal 12 of low-pass filter means 10. Low-pass filter means 10 may be utilized to filter out the noise present on the incoming instantaneous wheelspeed signal. Filter means 10 is shown as comprising a T-type filter, including series resistors R101 and R102, with their common connection being coupled to ground through capacitor C101 with resistors R101 and R102 being series connected between input and output terminals 12 and 13, respectively, of low-pass filter means 10. Filter means 10 removes noise from the input DC analog signal representative of the instantaneous value of wheelspeed which filtering action becomes of increased importance when this signal might become masked by a noise signal or a noise signal might cause a false response in the first channel and provide a false output first control signal at output terminal 33 of the first channel. It must be recognized that the first channel is seeking to process information signals of low amplitude representing small changes in wheelspeed which occur below skid level as contrasted to the effort applied in U.S. Pat No. 3,026,148 to Ruof supra where variations below skid level are removed to prevent them from affecting the pressure control valve. The low-pass filter means 10 thus aids in removing noise signals which might otherwise disturb the processing of the low-level information signals present on lead 11 in the first channel. A low-pass filter means is not incorporated in the less sensitive second channel comprising skid detector 60 coupled from the input terminal 9 of the antiskid control system by lead 61 and to summing amplifier 40 by lead 62 since large differences in wheelspeed velocity are required on lead 61 to actuate skid detector 60 and provide a second control signal on lead 62, and noise signals would not reach the amplitudes of such large difference in velocity signals to effect energization of skid detector 60 and consequently cause false output second control signals to appear on lead 62. Skid detector means 60 is a Δ V-type skid detector of known type which provides a second control signal on lead 62 when a skid condition is imminent or has been reached as indicated by a Δ V or substantial change in velocity of instantaneous wheelspeed signal present on its input on lead 61 representative of imminent or actual skid condition. When such a condition exists, the valve control voltage appearing at the control valve input circuit terminal 51 of large amplitude compared to the maximum amplitude which the first control signal may reach at the output terminal 33 of the first channel and a consequent large dump of brake pressure is effected by energization of the brake pressure control valve in order to bring the overtorqued wheel out of the skid condition. Δ V-type skid detector means 60 has a nonlinear mode of operation of the well-known "bang-bang" type and provides the second channel of the present antiskid control arrangement utilized to back up the linear mode of operation provided by the first channel in occurrences of large torque unbalances in the system. Skid detector means 60 may be of the same type as and may comprise the detector of FIG. 1 of U.S. Pat. No. 2,980,369 to Ruof having input lead 18 and providing its output from transistor 17.

The first channel having an input terminal 12 and output terminal 33 does not depend on wheelspeed departure to provide a first control signal to directly control brake pressure; rather, a signal is developed within the first channel which is a measure of instantaneous wheelspeed deceleration. Since the deceleration signal leads wheelspeed departure, a correction signal can be applied changing brake pressure before the wheel skids. By early correction only a small change in brake pressure is necessary; further, by measuring deceleration of the wheel continuously, brake pressure may be applied as well as reduced, allowing the use of a "closed loop" antiskid system rather than a previously mentioned prior art sampling system. The term "closed loop" is utilized here to designate systems according to the present invention since the term well characterizes the nature of the first channel performance which monitors instantaneous wheel deceleration continuously and provides the first control signal to control the antiskid valve and thus brake pressure when wheel deceleration deviates from a preselected target deceleration, thereby providing "closed loop" or continuous control for removing or increasing brake pressures to approach stability at the predetermined target rate of deceleration. The "closed loop" control provided by the first channel can be compared to the sampling systems of the prior art which may be characterized as "open loop" systems since not providing continuous control or modulation of applied brake pressure, rather depending on a departure of wheelspeed from stable braking speed to provide programmed pressure control of the wheel.

Figure 3:
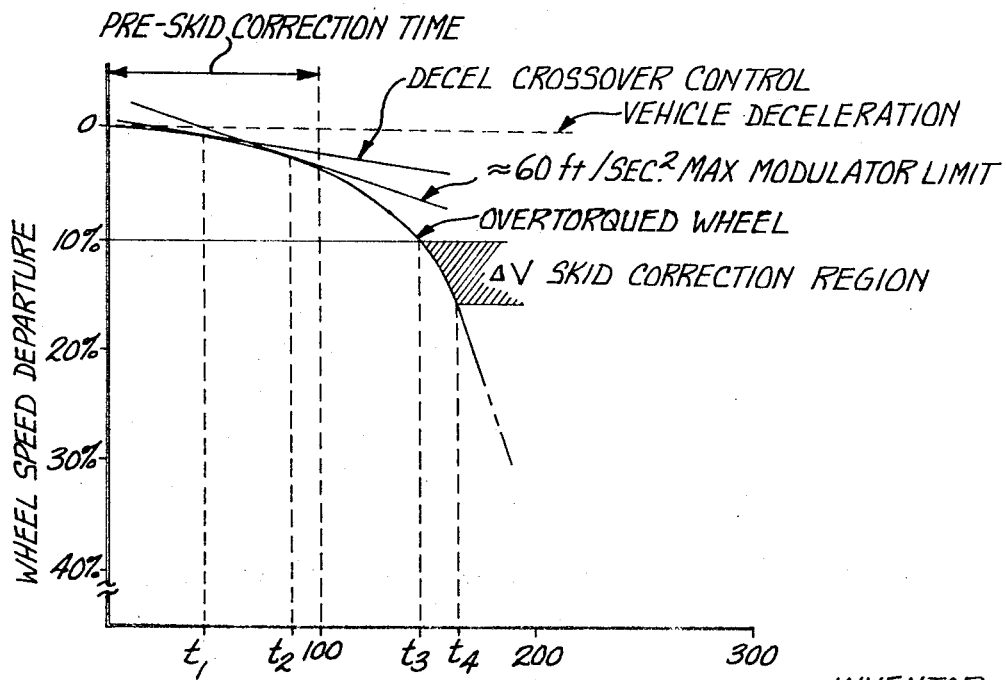
FIG. 3 is a graph illustrating the location and extent of the control regions provided by the first and second control channels of the antiskid control system embodiments of the present invention in relation to real time wheelspeed departure from synchronous speed.

The use of deceleration as a portion of the present design concept originated with observations made of change in wheelspeed slope which were found to occur 100 to 200 milliseconds prior to the wheel going into a skid (see FIG. 3). Furthermore, if a wheel were allowed to depart 6 feet/second from a maximum torque speed in 100 milliseconds, the average deceleration of the wheel during this period of time is 60 feet/second$^2$. In terms of deceleration then clearly a signal of sufficient magnitude can be developed to control the wheel before the actual skid occurs.

It was determined that although an ideal deceleration signal could not be derived from a DC analog signal of wheelspeed in a practical sense, a signal a few milliseconds lagging the ideal when obtained would be acceptable. This is particularly true recognizing that the main delay of the antiskid control system would occur in the hydraulic portion of the system. As noted, although an ideal deceleration signal cannot be obtained in the practical sense, the quality of such a signal which is acceptable is related to the response time of the hydraulic portion of the system. After the DC analog signal representative of wheelspeed has been passed through low-pass filter means 10 to remove noise, it is transmitted by lead 14 comprising a conductive wire element from the output terminal 13 of low-pass filter means 10 to the input terminal 21 of differentiator means 20 which includes a differentiating circuit including capacity C1, and an amplifying circuit including transistor Q1. At the output terminal 23 there is then developed the current $i_d$ which is representative of deceleration.

In obtaining a differentiated signal electrically ($dV/dt$ ) where V is the DC analog voltage proportional to wheelspeed previously referred to as the input signal provided at input terminal 9, it should be noted that only an approximation of the differential can be obtained. Since the deceleration signal is derived from wheelspeed velocity, an actual change in velocity must occur prior to the development of a deceleration signal, the amount of change in wheelspeed velocity determining the response time of the circuit and the response time being a function of the RC time constant and the gain of the circuit. Every differentiating circuit is really a $\Delta V/\Delta t$ circuit and so only when $\Delta V/\Delta t$ becomes small with respect to the period measured does the measured value approach the ideal $dV/dt$. When the response time of the hydraulic portion of the system is, for example, about 10 milliseconds, then the response time of the first channel control circuit which provides the first control signal must be less than 10 milliseconds. If $\Delta V/\Delta t$ were taken in the first channel with $\Delta t = 0.2$ seconds, then the first channel of the system would be measuring average deceleration over 0.2 seconds. The output signal developed would not be the instantaneous value of deceleration but a measure of the total wheelspeed change. For present hydraulic system response time of about 10 milliseconds then, a measure of the instantaneous deceleration in the range of 5 to 10 milliseconds which is equal to a less than hydraulic response time should be provided by the first channel control circuitry. While previous attempts have been made to develop and utilize so called "deceleration signals," the quality of these circuits in terms of their response times compared to hydraulic response times has not been sufficient to provide true deceleration signals which could be fully utilized to develop and maintain an early preskid control time rate of deceleration of the wheel.

Figure 2:
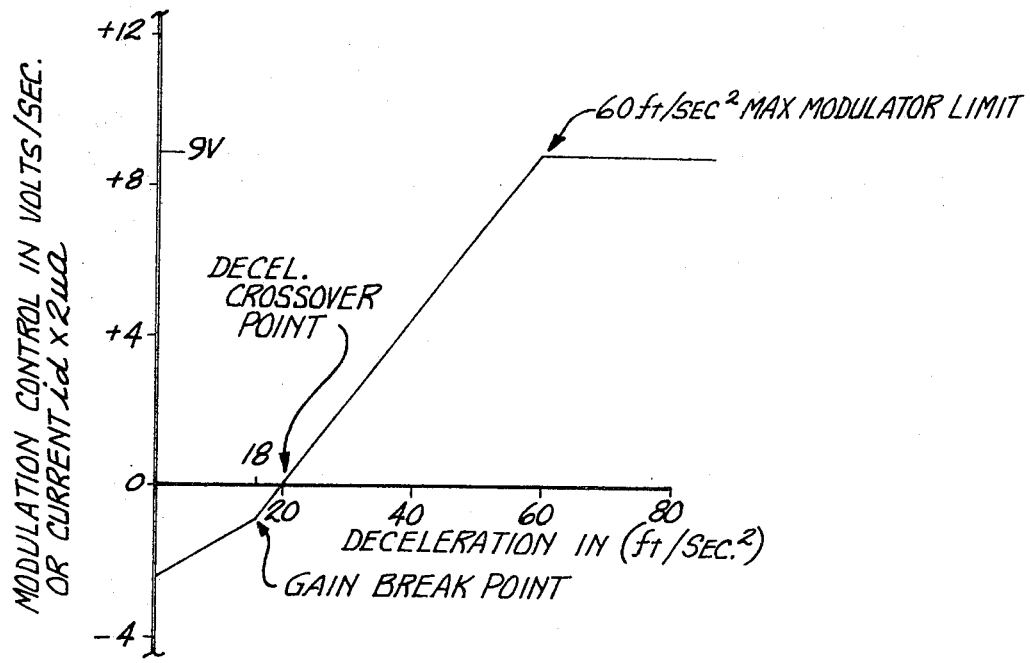
FIG. 2 is a graph illustrative of the linear control gain characteristics of the first channel which provides the first control signal in the antiskid control system embodiments of the present invention.

The first channel control circuit of FIG. 1 having an input terminal 12 and output terminal 34 for providing the first control signal satisfies the above-defined requirement of response time of 10 milliseconds or less while having a gain characteristic to provide a linear output from 0 to 60 feet/second$^2$ deceleration. The linear gain characteristics of the first channel of the control system can be seen from the FIG. 2 plot of $i_d$ (the output current representative of deceleration from output terminal 23 of differentiator means 20) times the constant 2 microamperes versus deceleration of the wheel and will be further explained in connection with the specific circuit description of FIG. 1.

Deceleration is measured in differentiator means 20 by the current flowing into differentiating capacitor C1. This circuit has the unique capacity of measuring early preskid correction time decelerations in the range of 1 to 60 feet/second$^2$. Under a normal deceleration condition where the braked wheel is not overtorqued, the current $i_d$ is developed by transistor Q1 which is representative of deceleration. This current $i_d$ may be represented by the equation:

$$i_d = K\alpha$$

where:
$\alpha$ = wheel deceleration
$K$ = constant

A reference current $i_r$ comprising the collector current of transistor Q2 is representative of the target rate of deceleration. This reference current is selected by adjustment of variable resistance R4 to provide that target rate of deceleration which is desired. The target deceleration is determined by $i_r$, which is set to the highest level the system can control in the closed loop mode without causing skids. Normally, this target deceleration will be set (by adjustment of R4) near or slightly above the maximum deceleration rate the vehicle can achieve. Rather than being set to a given value, since resistant R4 is a variable resistor, its resistance may be varied by hand as changing rates of target decelerations are desired either at intermittent intervals or continuously varied where slow increases and/or decreases in target rates of deceleration are desired. Either continuous or intermittent changes in target deceleration may be necessitated by changing conditions such as the aforementioned changes in wheel environment due to weather conditions, etc. While the resistance R4 may be varied continuously or intermittently by hand to vary continuously or intermittently the desired deceleration, such control may be effected by a programmed change of resistance R4 by circuit or electromechanical device to control $i_r$.

As previously mentioned, $i_r$ comprises the collector current generated by the constant current generator transistor Q2. The first control voltage $V_c$ appearing across capacitor C2 and also at the output terminal 33 of modulator means becomes the time integral of the instantaneous difference of the two currents $i_d$ and $i_r$ or:

$$V_c = 1\ C\int(i_d - i_r)dt$$

where $C$ = closed loop modulator capacitance

From the above relationship it can be seen that if $i_d$ is less than $i_r$ then $\alpha$ the deceleration of the wheel is less than target deceleration and the value of the integral is decreasing, causing $V_c$ to decrease and apply brake pressure. Thus, even under normal deceleration the wheel is under controlled pressure change. If $i_d$ is equal to $i_r$, the target deceleration is being obtained and no chance of first control voltage $V_c$ is occurring. The applied brake pressure under these conditions is maintained. For cases of wheel deceleration exceeding target deceleration, the value of $i_d - i_r$ becomes positive and the first control voltage $V_c$ applied through summing amplifier 40 to the input 51 of the brake pressure control valve operating circuit causes pressure reduction to keep the wheel under control by returning the wheel to the target deceleration.

Appearing then at input terminal 9 of the plural channel antiskid control system of FIG. 1 there is a DC voltage proportional to wheelspeed. In practice this DC voltage may have a ripple imposed upon it that would be differentiated unless the system included low-pass filter means 10. The filtered DC voltage representative of wheelspeed appears across capacitor C1. As the DC wheelspeed signal slowly decreases with vehicle deceleration, a current beings to flow out of the base of transistor Q1. Transistor Q1 is set at the threshold of conduction by the voltage difference applied between its emitter and base. Any drop in base voltage causes transistor Q1 to conduct. The current $i_d$ which then flows into capacitor C2 is controlled by the gain of the circuit which is determined by the resistance value of R1 for low rates of indicated wheel deceleration.

In the exemplary circuit of FIG. 1 according to the invention, components and electrical values are as follows:

| Resistors: | |
|---|---|
| R101 | 100 ohms |
| R102 | 100 ohms |
| R1 | 3.6 k ohms |
| R2 | 3.6 k ohms |
| R3 | 10 k ohms variable |
| R4 | 50 k ohms variable |
| R5 | 25 k ohms variable |
| R6 | 25 k ohms variable |
| Diodes: | |
| CR1 and other diodes | 1 N 4385 |
| VR1 Zener diode | 8 volt 100 MW |
| Capacitors: | |
| C101 | 0.01 mfd. |
| C1 | 10 mfd. |
| C2 | 0.05 mfd. |
| Transistors: | |
| Q1 | 2N2907 |
| Q2 | 2N2940 |

As deceleration increases, the voltage on the base of transistor Q1 decreases, causing transistor Q1 to conduct current $i_d$ in an amount determined by the gain setting of transistor Q1 which gain is determined by the amount of bias maintained on transistor amplifier Q1, the bias level in turn being determined by the resistance value of emitter resistor R1. As deceleration increases, the voltage appearing at the emitter of transistor Q1 drops until current is conducted through diode CR1. The emitter resistance then drops from the value of R1 to the value of the parallel combination of R1 and R2. With the circuit constants given as an example above for the circuit of FIG. 1, since R1 and R2 each equal 3,600 ohms the effective emitter resistance of transistor Q1 drops from 3,600 ohms to 1,800 ohms with diode CR1 conducting for the above-mentioned increased rates of deceleration. Since the emitter resistance is thus halved the gain at higher rates of deceleration occurring after CR1 has become conducting is doubled. This change in gain or gain break point occurs at a deceleration of 18 feet/second$^2$ which is determined by the values assigned to R1 and R2 and other circuit constants previously given for the circuit of FIG. 2. This gain break point and the gain settings desired above and below the gain break point may be changed by selection of different circuit constants. With the above-listed circuit constants for FIG. 1, the target deceleration is fixed at 20 feet/second$^2$ and the gain break point at this target rate of deceleration can be seen when reference is made to the circuit response characteristic, as shown in FIG. 2. At the lower rates of deceleration below 20 feet/second$^2$ the slope and consequent gain can be seen from FIG. 2 to be less than the slope and consequent gain of the circuit for deceleration values above 20 feet/second$^2$. Remembering that gain has doubled, then the slope of the curve has doubled above the gain break point so that twice as much increase in the current $i_d$ is provided for the same incremental increase in deceleration as occurred for the same incremental increases below the target deceleration value. Observation of the graph shows that the curve is continuous; that is, modulation control is continuously provided up to 60 feet/second$^2$ of deceleration which is the maximum limit of modulator ability to provide increased first control voltage to correct for the overtorqued wheel. This maximum modulator limit is regulated by series connected Zener diode VR1 and resistor R3 which set up a voltage level which clamps the minimum voltage that may exist on the base of transistor Q1. This voltage clamp provides the flat response portion of the curve as seen in FIG. 2 for decelerations above 60 feet/second$^2$. While the low gain and higher gain characteristics of the circuit above and below target deceleration, respectively, are determined as previously mentioned by the particular resistance values of R1, R2, and R3, the specific location of the gain break point itself is determined by the particular resistance values of the voltage divider formed by R2 and R5.

Turning now to modulator means 30, the transistor Q2 collector current $i_r$ is determined by the resistance value of R4. Transistor Q2 functions as a constant current discharge circuit and for a target deceleration of 20 feet/second$^2$; the resistor R4 is adjusted to provide a constant collector current $i_r$ of 48 microamperes. This current flow discharges capacitor C2 at a rate of 2 volts/second. The quiescent voltage on the base of transistor Q1 is set to cause 4 microamperes of current to flow through transistor Q1 with no deceleration. Any deceleration then causing additional current to flow through transistor Q1 in the manner already described. At the target deceleration of 20 feet/second$^2$, then, the current $i_d$ flowing through transistor Q1 is 48 microamperes, which equals the constant current discharge $i_r$ through transistor Q2. The first control voltage V$V_c$ is the voltage appearing on capacitor C2 and becomes the time integral of the instantaneous difference of the two currents $i_d$ and $i_r$ as previously mentioned.

The embodiment of the present invention shown in FIG. 4 utilizes operational amplifiers and may be of the type presently commercially available and identified as Fairchild operational amplifiers type MA 709.

The FIG. 4 embodiment operates in a manner similar to the already described embodiment shown in FIG. 1, the primed numerals of FIG. 4 representing correspondingly functioning portions having unprimed numerals in FIG. 1. In the FIG. 4 embodiment a 10:1 overtorque modulator means 70 has been included showing in detail the circuit design required to provide the overtorque modulator. Overtorque modulator means 70 receives an input signal from lead 62' only when the second channel has been activated by the presence of a large wheelspeed change in voltage $\Delta V$ on lead 61' indicative of a skid condition which activates skid detector means 60' thus providing the second control signal on lead 62'. The function of overtorque modulator means 70 when energized by the second control signal is to provide an overtorque modulator output signal which reduces or modulates the reapplication of increased pressure to the brake to a pressure slightly less than that which would cause skidding. The overtorque modulator means includes circuit means including a resistor and capacitor which function during relaxation of braking to create and store a bias signal and to utilize this bias signal to delay and feather reapplication of braking effort after the brake relaxing signal or second control signal indicative of a skid condition which is present on lead 62' disappears.

In the following, reference to FIGS. 2 and 3 will be made showing how the first channel providing correction quantities in the form of the first control signal which is a linear and continuous function of deceleration over the range of 1 to 60 feet/second$^2$ is effective during the early preskid correction time of 100 milliseconds of wheelspeed deviation to correct the overtorqued wheel by controlling pressure in an amount which tends to yield the desired target deceleration. Also, the backup provided by the second channel which operates in the nonlinear mode and produces the larger amplitude pressure reducing second control signal will be shown in its time sequence with wheelspeed departure so that its relationship in time with first channel control can be appreciated.

If the vehicle is decelerating with no overtorque condition existing on the wheel, the modulation control in volts/second provided by the first channel will be below the deceleration crossover point on FIG. 2. Pressure may be increasing slightly depending on vehicle deceleration since modulation control is in the negative region indicating a first control signal output acting to energize the antiskid valve input control circuit in a manner to increase the applied brake pressure toward its metered value. The deceleration of the wheel would correspond with the vehicle deceleration line shown in FIG. 3. As the wheel becomes slightly overtorqued, a torque imbalance exists where brake torque exceeds ground torque and wheel deceleration would increase at a rate determined by the overtorqued condition as shown by the curve in FIG. 3 representing departure of wheelspeed and the deceleration would exceed the deceleration crossover control point of FIG. 2 almost as soon as the overtorque condition exists; in fact, at $t_1$, which is less than 100 milliseconds of elapsed preskid correction time, as can be seen from FIG. 3. It can be readily observed from FIG. 2 that modulation control in the first channel is providing a positive control thus reducing brake pressure by means of the energized antiskid valve after the deceleration crossover point has been reached, and this occurs at $t_1$ which is prior to the lapse of the 100 millisecond preskid correction time period as shown in FIG. 3. If the overtorque condition becomes too large for the first channel control signal voltage to correct, that is, the deceleration, has exceeded the maximum modulator limit of 60 feet/second$^2$ with modulation control of about 9 volts/second as seen in FIG. 2 (because of a large change in ground friction, etc.) at time $t_2$, then, subsequently, at time $t_3$ when wheelspeed departure from vehicle synchronous speed has departed 10 percent the $\Delta$-velocity-type skid detector 60 is energized in the second channel and the second control signal is provided through summing amplifier 40 to energize the antiskid valve input circuit at input terminal 51 in a manner which provides rapid dump of brake pressure exceeding that which can be provided by the first channel-generated first control signal which is limited at the maximum modulator limit of 60 feet/second$^2$. The maximum modulator limit was set by the clamping circuit design mentioned earlier in connection with the FIG. 1 circuit description. A value of 60 feet/second$^2$ was chosen since it was found that beyond this limit the wheel has become so severely overtorqued that it will thereafter rapidly degenerate into a skid and a most satisfactory control then is the large pressure dump provided by the second channel $\Delta$-velocity-type skid detector control. Once the wheelspeed has been corrected by the second channel-generated pressure dump, the first channel closed loop portion of the system will function to provide the first control signal when rate of deceleration is within the first channel range of control of 1 to 60 feet/second$^2$. The first channel has continuous and linear control gain over this range of operation as previously discussed and noted when attention is drawn to FIG. 2. With the linear control gain over the regions of operation specified in FIG. 2, the system is prevented from becoming unstable.

It is recognized that the deceleration of a wheel in excess of vehicle deceleration is directly relatable to the excess torque on the brake since:

$$T^1 = T_B - T_{max}$$

where $T^1$ = Torque imbalance
$T_B$ = Brake torque
and $$T^1 = \bar{I}_\omega \alpha_1 \text{ where } \bar{I}_\omega =$$

where $I$ = angular moment of inertia of wheel
$\alpha_1$ = wheel deceleration in excess of vehicle. Thus the exact amount of brake pressure that may be calculated to bring $\alpha_1$ back to zero is:

$$T^1 = K\Delta P \text{ or } \Delta P = T^1/K$$

where $K$=Torque/pressure gain of brake.

The first channel mode of control prevents instability of the system by applying the $\Delta P$ correction continually and in a ramp function with a gain factor below unity at the natural frequency of the wheel structure. Where the natural frequency of the wheel structure is about 11 cycles per second then the loop gain of the system is less than unity gain at this frequency when operating in the linear region of first channel control or nonlinearly under second channel control. The present system permits preselection of a target deceleration or selection of a rate of deceleration varying with time by individually setting resistor R4 or varying the resistance setting of R4 with time respectively as previously indicated. Brake pressure correction by means of antiskid valve control exists only when the actual wheel deceleration deviates from the target deceleration thus assuring that unnecessary wheelspeed departures will not be permitted.

While in the preceding description of the invention exemplary circuit means and connections as well as specific electrical values have been set forth by way of example, it will be evident to those skilled in the art that in the light of the present disclosure variations may be made without departing from the true spirit and scope of the invention and without exercise of more than ordinary skill in the art. Accordingly, it is not desired that the invention be restricted to the exemplary details, other than is required by the recitations of the appended claims.

I claim

1. An anti skid control system for a wheel comprising:
    input means for coupling to a signal source for receiving a first signal whose amplitude is a function of the speed of the wheel to be braked;
    differentiator means for differentiating said first signal from said signal source and providing an output signal whose amplitude is a function of the rate of deceleration of said wheel;
    said differentiator means including means for amplifying said differentiated first signal to provide said output signal, said means for amplifying said differentiated first signal including means for varying the gain of said amplifying means, the gain of said amplifying means being a function of the deceleration rate of the wheel;
    modulating means coupled to said differentiator means, said modulating means including
      means for generating a second signal whose amplitude is a function of a predetermined rate of deceleration,
        said predetermined rate of deceleration being greater than the maximum rate of deceleration of the vehicle, and
      circuit means responsive to said output signal, and said second signal and acting to produce a control signal which is substantially proportional to the time integral of the instantaneous difference of said output signal and said second signal, and
    output means for coupling said control signal to the operating circuit of an electrically operated brake pressure control valve of the wheel braking apparatus for the wheel.

2. In an antiskid system, means for generating a valve-controlling signal comprising
    means for producing a first signal voltage substantially proportional to wheelspeed;
    means for producing a second signal voltage substantially proportional to rate of change of wheelspeed;
    means for amplifying said second signal, said means for amplifying said second signal comprising an amplifier having a linear gain region of operation in response to said second signal, said amplifier having a further linear gain region of operation of higher value when said second signal representative of rate of change of wheelspeed exceeds a given value;
    means for producing a third signal voltage of predetermined value;
    means for comparing said amplified second signal with said third signal to provide a first control signal;
    skid detector means responsive to said first signal voltage for providing a second control signal, and
    means for adding said first and second control signals to provide said valve controlling signal.

3. Antiskid control means for a vehicle wheel comprising, in combination:
    means providing a first signal voltage the amplitude of which is proportional to wheelspeed;
    differentiator circuit means responsive to said first signal voltage for providing a second signal voltage proportional to the deceleration of said wheel;
    modulator circuit means responsive to said second signal voltage for providing a first control signal having an amplitude less than a predetermined value;
    skid detector means responsive to said first signal voltage for providing a second control signal having an amplitude greater than said predetermined value;
    means for controlling braking effort in response to said first and second control signals, and
    overtorque modulator means coupled between said skid detector means and said modulator circuit means.

4. Antiskid control means for a vehicle wheel comprising, in combination;
    wheel-braking apparatus for establishing a brake application on the vehicle wheel;
    said wheel-braking apparatus including an antiskid valve input circuit having an input terminal for receiving antiskid control signals;
    a first channel responsive to analog signals representative of wheelspeed derived from said wheel for generating a first control signal which is a continuous function of the rate of deceleration of said wheel over a predetermined range of rates of deceleration;
    a second channel responsive to analog signals representative of wheelspeed derived from said wheel for generating a second control signal when the difference in amplitude of said analog signals exceeds a predetermined value within a given time period;
    means for coupling said first and second control signals to said input terminal, and wherein said means for coupling said first and second control signals to said input terminal comprises a summing amplifier.

5. Antiskid control means according to claim 4 wherein said first channel response time is less than the hydraulic response time of said wheel-braking apparatus.

6. Antiskid control means according to claim 4 wherein said first channel response time is 10 milliseconds or less.

7. An antiskid control circuit comprising:
    low-pass filter means for coupling to a signal source representative of wheelspeed;
    differentiator means including an amplifier coupled to said low-pass filter means and responsive to signals representative of wheelspeed from said signal source for developing an electrical current output signal representative of wheelspeed deceleration;

said amplifier means comprising an amplifier having a first linear gain region of operation and a second linear gain region of operation of higher value when said wheelspeed deceleration exceeds a given value;

modulating means including a capacitor and a constant current discharge circuit coupled to said differentiator means, said modulating means including means including said constant current discharge circuit for generating a signal current whose amplitude is a function of a predetermined rate of deceleration, said constant current discharge circuit including variable resistance means for selecting said predetermined target rate of deceleration, and circuit means including said capacitor coupled to said constant current discharge circuit responsive to said output signal representative of wheelspeed deceleration, and said signal whose amplitude is a function of a predetermined rate of deceleration, and acting to produce a control signal current continuously over the range of 1 to 60 feet/second$^2$ deceleration which is substantially proportional to the time integral of the instantaneous difference of said output signal representative of wheelspeed deceleration and said signal whose amplitude is a function of a predetermined rate of deceleration, and output means for coupling said control signal to the operating circuit of an electrically operated brake pressure control valve of the wheel braking apparatus for the wheel.